United States Patent [19]

Poganski

[11] Patent Number: 4,645,224
[45] Date of Patent: Feb. 24, 1987

[54] TRAILER TONGUE HANDLE

[76] Inventor: John W. Poganski, 5541 N.E. River Rd., Sauk Rapids, Minn. 56379

[21] Appl. No.: 713,981

[22] Filed: Mar. 20, 1985

[51] Int. Cl.⁴ .............................................. B62B 5/06
[52] U.S. Cl. .................................. 280/47.17; 16/112; 16/126; 280/47.37 R; 280/400; 280/475; 280/504; 294/15; 403/93
[58] Field of Search .................. 280/400, 402, 425 R, 280/425 A, 47.17, 47.37, 47.21, 414.1, 475, 504; 403/93, 96, 84, 146; 294/15; 16/112, 126, 127; 24/585, 241 P; D12/178

[56] References Cited

U.S. PATENT DOCUMENTS

| | | | |
|---|---|---|---|
| 1,178,857 | 4/1916 | Kirner | 280/482 |
| 1,274,152 | 7/1918 | Ells | 280/47.37 X |
| 2,439,907 | 4/1948 | Poglein | 294/26 |
| 2,499,841 | 3/1950 | Ulmer | 16/114 RX |
| 2,926,930 | 3/1960 | Pease | 280/414.1 X |
| 3,189,365 | 6/1965 | Blacher | 280/414.1 X |
| 3,348,860 | 10/1967 | Buckles | 280/414.1 X |
| 3,379,452 | 4/1968 | Torrisi | 280/414.1 X |
| 3,401,951 | 9/1968 | Bloom | 280/47.17 |
| 3,583,744 | 6/1971 | West | 294/15 |
| 3,612,555 | 10/1971 | Baker | 280/47.17 X |
| 4,037,853 | 7/1977 | Sparks | 280/47.37 X |
| 4,366,933 | 1/1983 | Broussard | 280/47.26 X |

Primary Examiner—David M. Mitchell
Assistant Examiner—Mitchell J. Hill
Attorney, Agent, or Firm—Harvey B. Jacobson

[57] ABSTRACT

An elongated trailer tongue having a forward end equipped with tow hitch structure is provided and an elongated handle is supported from the tongue rearward of the tow hitch structure in at least slightly elevated position relative to the tongue. The handle is mounted from the tongue for angular displacement about a vertical axis generally centered transversely of the tongue and the handle and also disposed centrally intermediate the opposite ends of the handle. The handle is angularly displaceable relative to the tongue between two positions with the handle generally paralleling the tongue in the first position thereof and disposed transverse to the tongue in the second position thereof.

6 Claims, 6 Drawing Figures

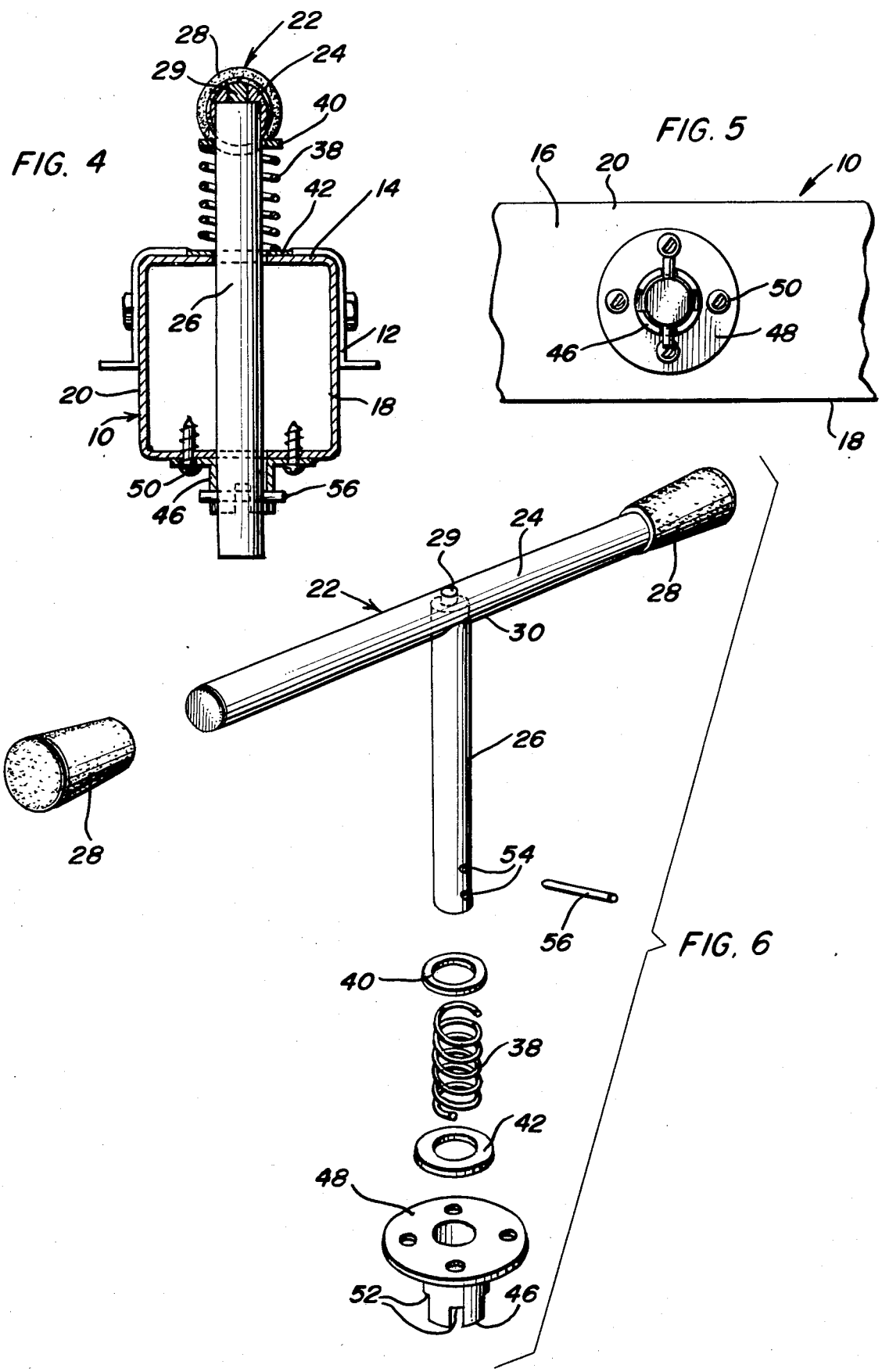

TRAILER TONGUE HANDLE

BACKGROUND OF THE INVENTION

1. Field of the Invention

This invention relates to a handle construction mounted on the forward end portion of a trailer tongue rearward of the trailer coupling thereof and which may be shifted between two different positions to facilitate the lifting and maneuvering of the trailer tongue by a single person or by two persons.

2. Description of Related Art

Various different forms of structures heretofore have been provided to facilitate supporting the tongue of a trailer in an elevated position and the maneuvering of the trailer tongue either toward a storage position or into position for lowering into coupled engagement with a hitch construction mounted on an associated towing vehicle.

These various forms of prior structures include handle equipped wheel dollies and ground props as well as more simplified handle structures. Examples of various different forms of trailer tongue attachments and handle structures including some of the general structural and operational features of the instant invention are disclosed in U.S. Pat. Nos. 2,926,930, 3,189,365, 3,348,860, 3,379,452, 3,583,744, 3,612,555 and 4,037,853. However, these previously known devices include relatively complex and expensive structures, or they comprise simple fixed handle structures which may not be readily utilized to advantage by either one or two persons attempting to lift and maneuver a trailer tongue.

SUMMARY OF THE INVENTION

The trailer handle of the instant invention comprises a horizontally elongated handle and mounting structure therefor, whereby the handle may be mounted in slightly spaced elevated position above the forward end portion of an associated trailer tongue for angular displacement about an upstanding axis generally centrally located between the opposite sides of the trailer tongue and handle and centrally intermediate the opposite handle ends. The mounting structure includes means whereby the handle may be selectively locked in a first position extending transversely of the associated trailer tongue or in a second position extending longitudinally of the associated trailer tongue.

The main object of this invention is to provide a lifting and maneuvering handle for the forward end portion of a trailer tongue to assist either a single person or two persons in lifting and maneuvering a trailer tongue.

Another object of this invention is to provide a handle construction in accordance with the preceding object and which may readily retrofitted to existing trailer tongues as well as included in the manufacture of new trailer tongues.

Still another important object of this invention is to provide a handle assembly which may be used in conjunction with the trailer tongues of various different types of trailers.

A final object of this invention to be specifically enumerated herein is to provide a trailer tongue lifting and maneuvering handle in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 4 is a transverse vertical sectional view taken substantially upon the plane indicated by the section line 4—4 of FIG. 3;

FIG. 5 is a horizontal sectional view taken substantially upon the plane indicated by the section line 5—5 of FIG. 3; and FIG. 6 is an exploded perspective view of the handle assembly including its mounting structure.

DESCRIPTION OF THE PREFERRED EMBODIMENT

Figure 1:
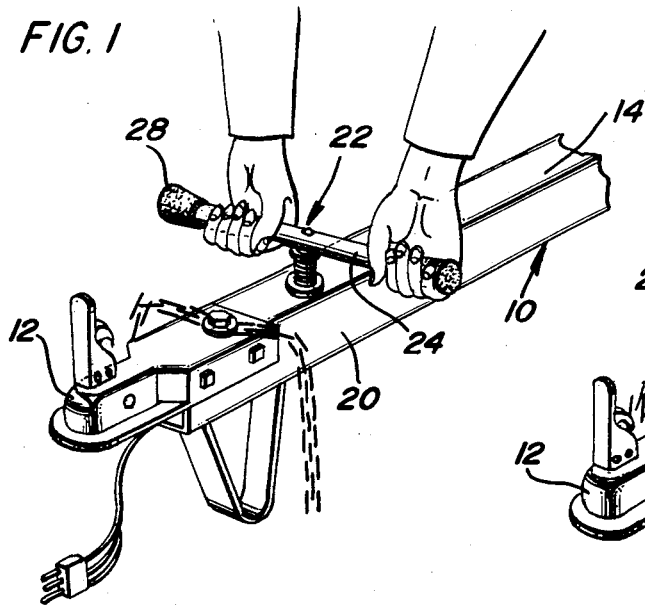
FIG. 1 is a fragmentary perspective view of the forward end portion of a typical trailer tongue with the handle of the instant invention operatively associated therewith and in a position extending transversely of the trailer tongue.

Referring now more specifically to the drawings the numeral 10 generally designates a forwardly projecting trailer tongue including a hitch coupler assembly 12 mounted on its forward terminal end. The trailer tongue 10 comprises a tubular member which is substantially rectangular in configuration and includes top and bottom walls 14 and 16 interconnected by upstanding side walls 18 and 20 extending there between.

The handle assembly of the instant invention is referred to in general by the reference numeral 22 and includes an elongated tubular handle 24 which is horizontally disposed and includes a central depending solid shank portion 26. The opposite ends of the handle 24 are capped by resilient closure caps 28. The center of handle 24 is bored to except solid shank portion 26. The top of center handle 24 is bored with a smaller diameter hole and fill welded as at 29 to 26 and 24-26 and 24 are also welded as at 30.

The tongue 10 includes vertically registered bores 34 and 36 formed in the top and bottom walls 14 and 16 and the shank portion 26 is slidably and rotatably received through the bores 34 and 36. A compression spring 38 is disposed about the upper end of the shank portion 26 above the top wall 14 and upper and lower washers 40 and 42 are disposed on the shank portion upper end above and below the spring 38. The washer 42 bears downwardly upon the upper surface of the top wall 14 and the washer 40 bears upwardly against the handle 24.

The handle assembly 22 further includes a guide sleeve 46 equipped with a peripherally apertured mounting flange 48 on one end and the guide sleeve 46 is mounted on the underside of the towing tongue 10 through the utilization of threaded fasteners 50 secured upwardly through the flange 48 and into the bottom wall 16. The guide sleeve 46 is registered with the opening or bore 36 and lower end of the guide sleeve includes two pairs of diametrically opposite and endwise outwardly and downwardly opening slots 52 formed therein. The lower end of the shank portion 26 includes a pair of longitudinally spaced parallel diametric bores 54 disposed transverse to the handle 24 and an abutment pin 56 is secured through one of the bores 54.

Figure 3:
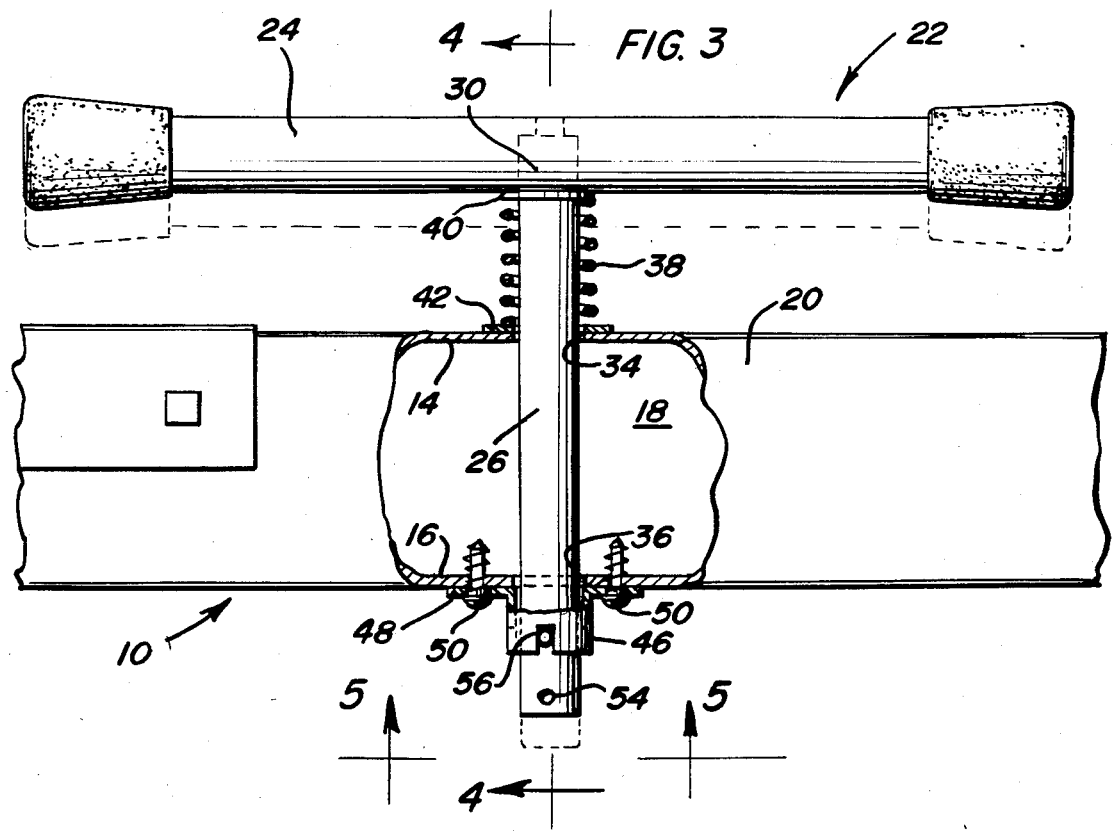
FIG. 3 is an enlarged fragmentary side elevational view of the handle supporting portion of the trailer tongue with parts of the tongue and handle assembly being broken away and illustrated in vertical section.

The guide sleeve 46 is secured to the underside of the towing tongue 10 in a manner such that the first pair of the slots 52 are aligned longitudinally of the tongue 10 and the second pair of slots 52 are aligned transversely of the tongue and it may be seen from FIGS. 3 and 4 of the drawings that the opposite ends of the pin 56 are receivable in each pair of notches 52. Accordingly, the shank portion may be keyed relative to the guide sleeve 46 with the handle 24 extending either longitudinally of the towing tongue 10 or transversely of the towing tongue 10, the compression spring 38 serving to yieldingly upwardly bias the shank portion 26 to a position with the pin 56 engaged either with the lower end of the guide sleeve 46 or seated in a selected pair of the notches 52. Assuming that the opposite ends of the pin 56 are seated in the notches 52 aligned transversely of the tongue 10, the handle 24 parallels the tongue 10. However, if the opposite ends of the pin are seated in the notches aligned longitudinally of the trailer tongue 10, the handle 24 is disposed transverse to the towing tongue 10.

Figure 2:
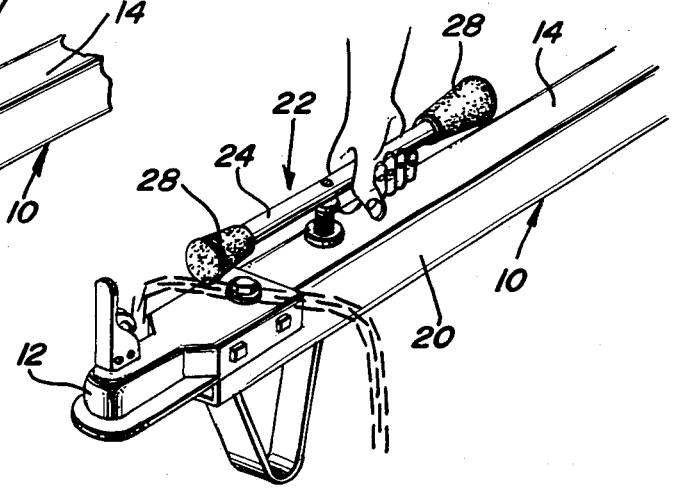
FIG. 2 is a fragmentary perspective view similar to FIG. 1 and illustrating the lifting handle in its alternate position extending longitudinally of the trailer tongue.

In operation, and assuming the handle assembly 22 is positioned as illustrated in FIG. 2 of the drawings, when a single person wishes to lift and maneuver the trailer tongue 10, that person may stand along the left hand side of the tongue 10 and grasp the handle 24, either forward or rearward of the shank portion 26, with his right hand as illustrated in FIG. 2 of the drawings and exert an upward pull on the handle 24. In this manner, once the tongue 10 has been raised the person supporting the weight of the forward end of the trailer tongue may walk forwardly to move the trailer tongue 10 and the associated trailer in a forward direction. Further, if the trailer tongue 10 is loaded quite heavily, a single person may stand facing the trailer tongue from either side and grasp the handle 24 with both hands at locations on the handle 24 disposed on opposite sides of the shank portion 26 and exert the necessary upward force on the handle 24 in order to lift the trailer tongue 10.

On the other hand, if two persons are to grasp, lift upward upon and maneuver the handle assembly 22, a downward force is applied to the handle 24 in order to downwardly displace the shank portion 26 sufficiently to unseat the opposite ends of the pin 56 from the notches 52 registered transversely of the trailer tongue. Then, the handle 24 may be rotated to a position disposed transverse to the trailer tongue 10 with the opposite ends of the pin 56 registered with the notches 52 aligned longitudinally of the trailer tongue. The downward force on the handle assembly 22 may then be relaxed in order that the spring 38 may upwardly displace the shank portion 26 to a position with the opposite ends of the pin 56 seated in the notches registered longitudinally of the trailer tongue 10. Then, the two persons desiring to raise and maneuver the trailer tonge 10 may position themselves on opposite sides of the trailer tongue 10 and grasp the adjacent end of the handle 24 with their hand closest to the trailer tongue 10 and exert and upward pull thereon.

After two persons maneuvering the trailer tongue 10 have completed their maneuvering operation, the handle 24 may again be downwardly displaced in order to disengage the opposite ends of the pin 56 from the notches 52 aligned longitudinally of the trailer tongue 10 and the handle 24 may be rotated back to the position thereof illustrated in FIG. 2 of the drawings.

When the handle 24 is disposed in the position illustrated in FIG. 2 it does not comprise an obstruction to normal operation of the trailer tongue during sharp turning movements and it is positioned out of the way against contact by a person standing along side the tongue 10. However, when it is desired or necessary for two people to lift and maneuver the tongue 10 the handle may be swung to and keyed in the transverse position thereof illustrated in FIG. 1.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a trailer of the type including an elongated forwardly projecting towing tongue equipped with tow hitch means at its forward end adapted for coupling to a towing vehicles, an elongated handle for assisting in a manually lifting and maneuvering with tongue, said handle being generally horizontally disposed, means supporting said handle from the forward end portion of said tongue with said handle spaced above said tongue and for selected angularly displacement of said handle about an upstanding axis relative to said tongue between first and second positions with said handle disposed transverse to and paralleling said tongue, respectively, said means supporting said handle from said tongue including a vertical passage formed through said tongue and a depending shank carried by said handle reciprocally rotatably and slidably received through said passage and coacting abutment means carried by the lower end of said shank portion and tongue limiting upward displacement of said shank portion relative to said tongue.

2. The tongue and handle combination of claim 1 wherein said axis is generally centered transversely of said tongue and handle and disposed centrally intermediate the opposite ends of said handle.

3. The tongue and handle combination of claim 1 wherein said abutment means and tongue include coacting structure operative to releasably key said shank portion in relatively angularly displaced positions thereof in which said handle is disposed in said first and second positions when said shank portion is disposed in its uppermost limit position.

4. The tongue and handle combination of claim 3 including spring means operatively connected between said handle and tongue yieldingly biasing said handle to the upper most limit position thereof.

5. The tongue and handle combination of claim 4 wherein said axis is generally centered transversely of said tongue and handle and disposed centrally intermediate the opposite ends of said handle.

6. The tongue and handle assembly combination of claim 1 wherein said coacting abutment means includes structure operative to releasably key said shank in relatively angularly displaced positions thereof in which said handle is disposed in said first and second positions.

* * * * *